(12) United States Patent
Tsuruta et al.

(10) Patent No.: US 8,155,245 B2
(45) Date of Patent: Apr. 10, 2012

(54) MODULATION SCHEME ESTIMATION APPARATUS AND METHOD

(75) Inventors: Makoto Tsuruta, Kawasaki (JP); Mikihiro Yamazaki, Kawasaki (JP); Shizuo Akiyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 624 days.

(21) Appl. No.: 12/342,007

(22) Filed: Dec. 22, 2008

(65) Prior Publication Data

US 2009/0207950 A1 Aug. 20, 2009

(30) Foreign Application Priority Data

Dec. 26, 2007 (JP) ................................. 2007-335281

(51) Int. Cl.
*H04L 27/06* (2006.01)
(52) U.S. Cl. ......... 375/340; 375/316; 375/342; 375/343
(58) Field of Classification Search .................. 375/316, 375/354, 365, 340, 342–343; 455/67.11, 455/423
See application file for complete search history.

(56) References Cited

U.S. PATENT DOCUMENTS

| | | | |
|---|---|---|---|
| 6,879,626 B1 * | 4/2005 | Sudo ............................. | 375/219 |
| 6,934,342 B1 * | 8/2005 | Ishii et al. ..................... | 375/316 |
| 7,773,682 B2 * | 8/2010 | Hayashi et al. ............... | 375/260 |
| 2004/0137848 A1 * | 7/2004 | Saito et al. ................. | 455/67.11 |

FOREIGN PATENT DOCUMENTS

JP 2001-086171 3/2001

OTHER PUBLICATIONS

Grimaldi et al. "An Automatic Digital Modulation Classifier for Measurement on Telecommunication Networks", IEEE, Oct. 2007, pp. 1711-1720.*
H. Ketter, et al; "Classification of modulation modes using time-frequency methods," ICASSP '99. Proceeding; vol. 5, pp. 2471-2474. Mar. 1999.

* cited by examiner

*Primary Examiner* — Chieh M Fan
*Assistant Examiner* — Sophia Vlahos
(74) *Attorney, Agent, or Firm* — Turocy & Watson, LLP

(57) ABSTRACT

A modulation scheme estimation apparatus includes a receiving unit receiving a first signal, a generation unit generating a plurality of first phase amounts, an acquisition unit acquiring a plurality of multiplication signals by multiplying the first signal by each of the first phase amounts, an extraction unit extracting a plurality of second signals corresponding to respective direct-current components of third signals obtained by subjecting the multiplication signals to Fourier transform, a first computation unit computing a plurality of sums, each of which is a sum of each of the multiplication signals and a corresponding one of the second signals, a second computation unit computing a plurality of absolute values of the sums, and a first identifying unit identifying a modulation scheme corresponding to one of the absolute values which has a highest similarity with respect to reference values associated with modulation schemes.

13 Claims, 8 Drawing Sheets

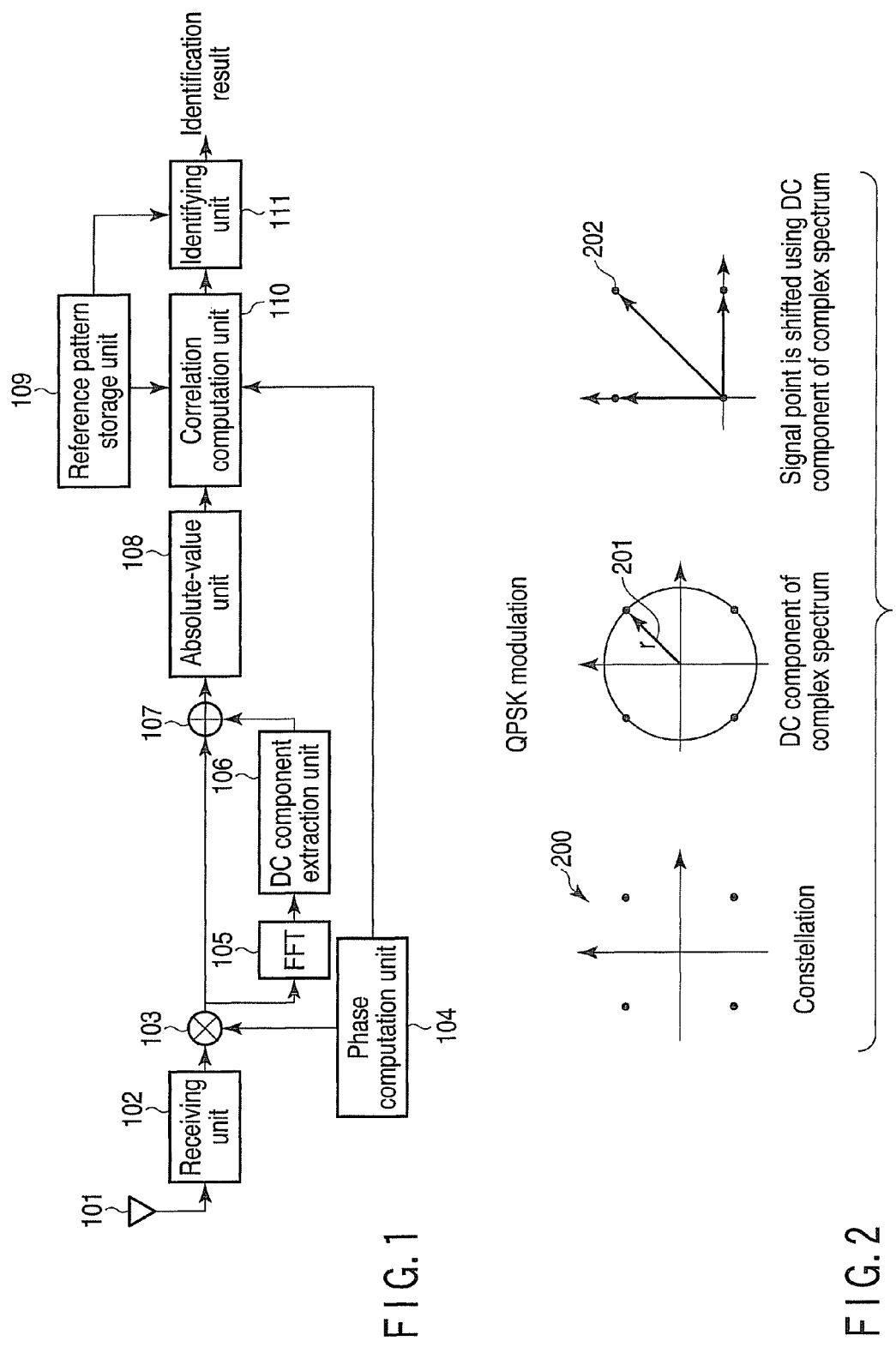

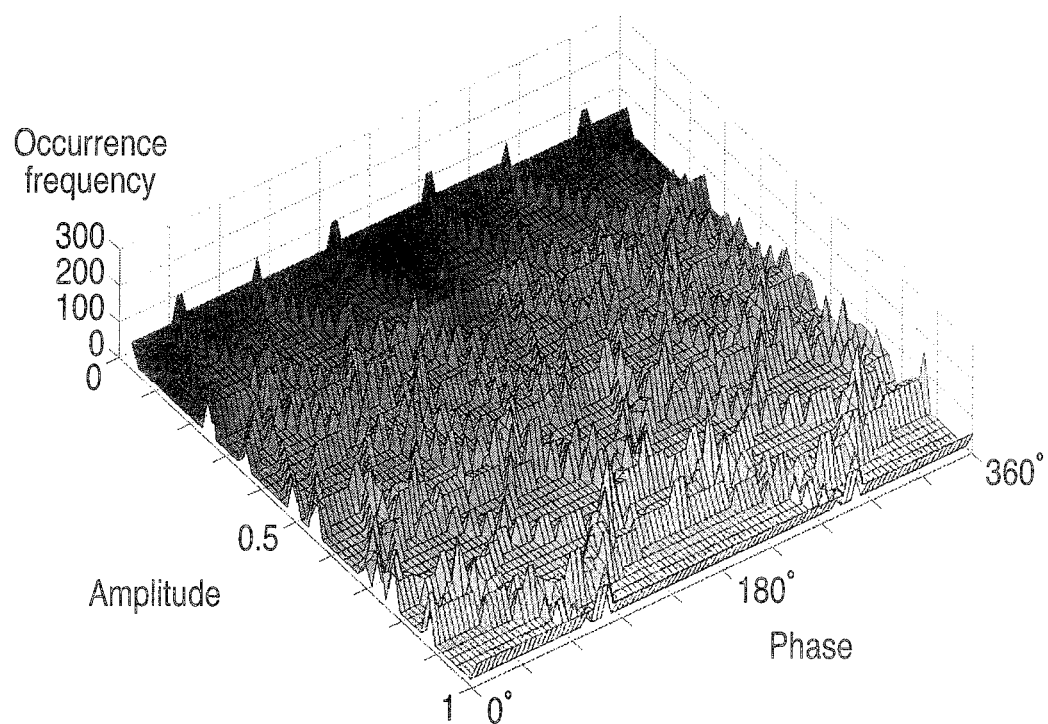
F I G. 4B
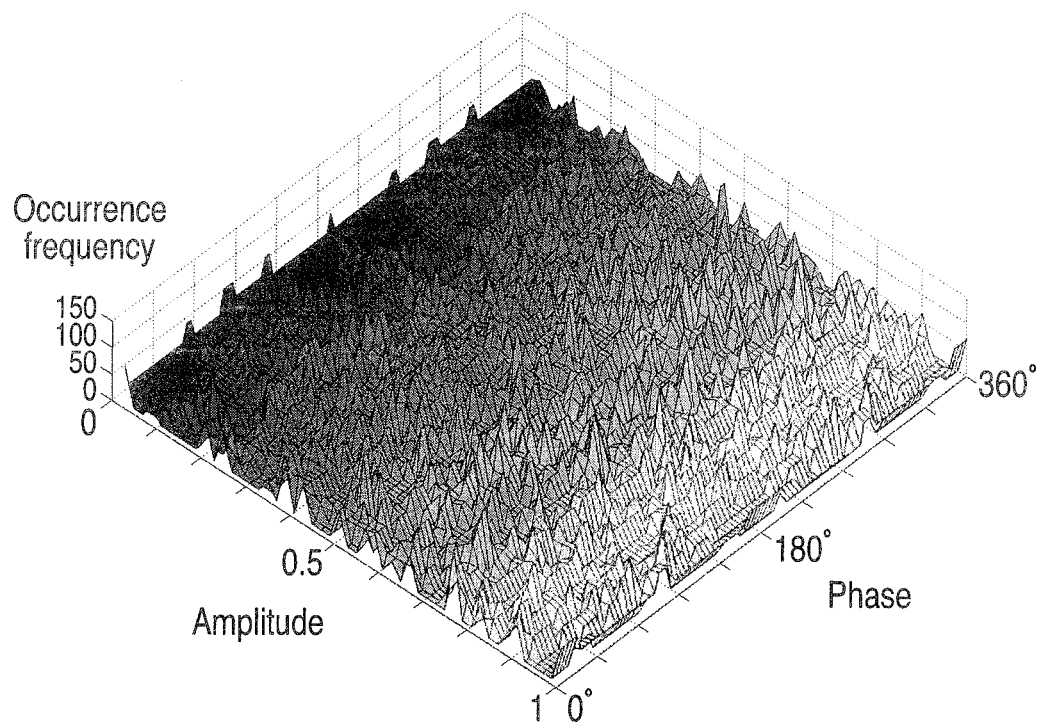
F I G. 4C

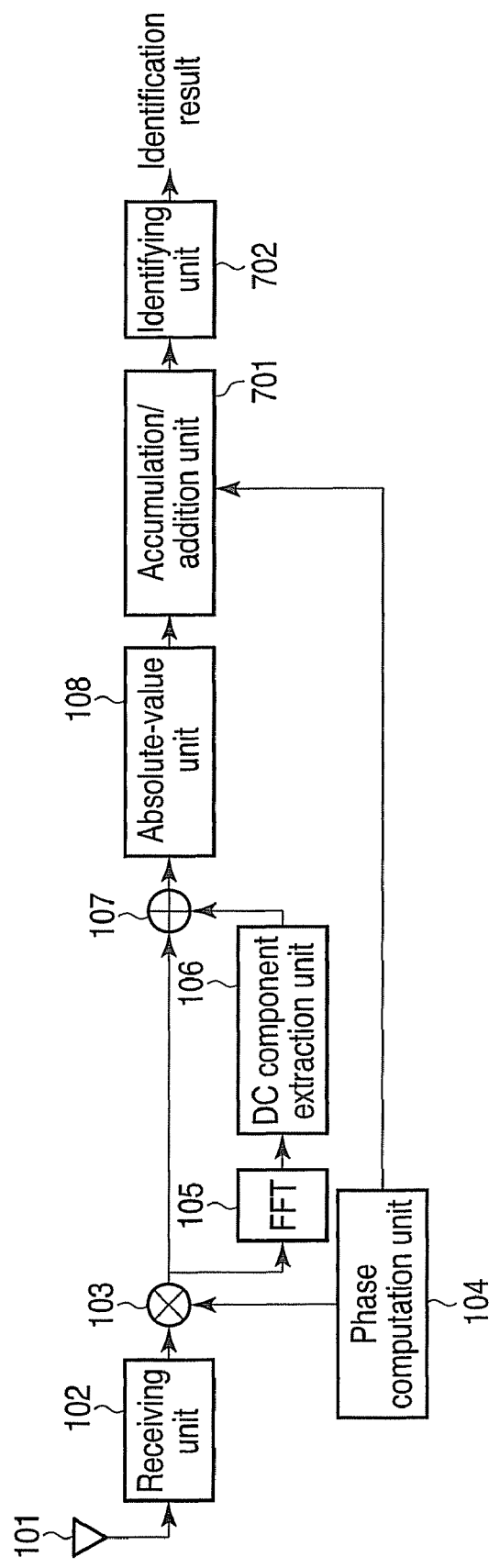
F I G. 7

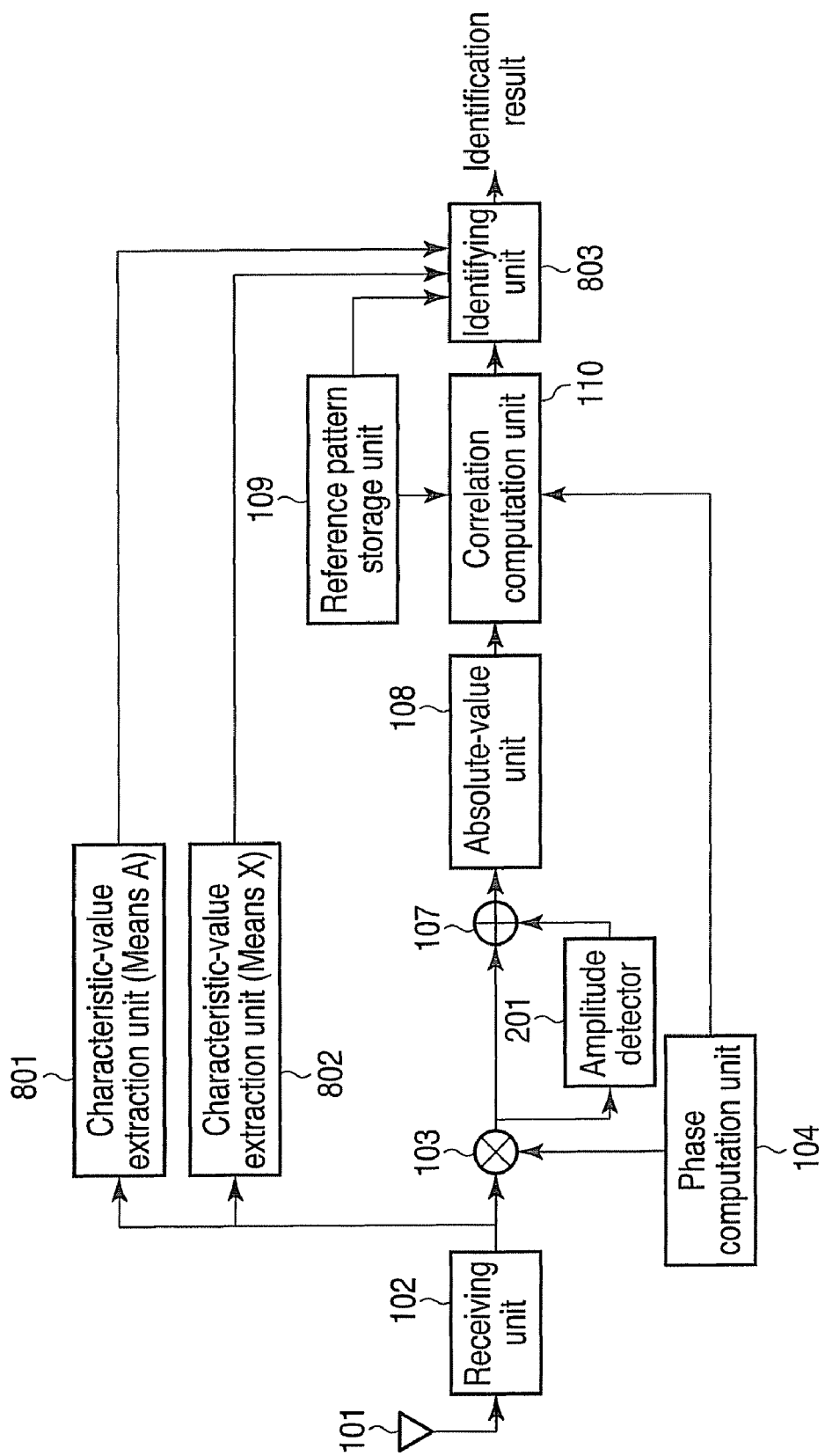
F I G. 8

MODULATION SCHEME ESTIMATION APPARATUS AND METHOD

CROSS-REFERENCE TO RELATED APPLICATIONS

This application is based upon and claims the benefit of priority from prior Japanese Patent Application No. 2007-335281, filed Dec. 26, 2007, the entire contents of which are incorporated herein by reference.

BACKGROUND OF THE INVENTION

1. Field of the Invention

The present invention relates to a signal detection technique, such as modulation scheme identification, and more particularly, to a modulation scheme estimation apparatus and method for automatically detecting modulation scheme of a modulation signal.

2. Description of the Related Art

As a conventional technique of automatically detecting modulation scheme of a digital modulation signal, a linear modulation identification method has been proposed, which includes two processes to be executed successively, i.e., the process of identifying, using amplitude distribution characteristic extraction, the orthogonal amplitude modulation schemes and phase modulation schemes of M-Quadrature amplitude modulation (M-QAM), Binary Phase Shift Keying (BPSK), Quadrature Phase Shift Keying (QPSK), π/4-QPSK and M-Phase Shift Keying (M-PSK), and the process of identifying BPSK, QPSK, π/4-QPSK and M-PSK, using angle distribution extraction (see, for example, JP-A 2001-86171 (KOKAI)).

Further, a linear-modulation identification method, in which Cross Margenau-Hill Distribution (CMHD) that is known in the field of quantum mechanics is applied to modulation scheme estimation, has been proposed (see, for example, H. Ketterer et al., "Classification of modulation modes using time-frequency methods," ICASSP '99. Proceedings, Vol. 5, pp. 2471-2474. March 1999).

However, in the above-mentioned prior art documents, after orthogonal amplitude modulation and phase modulation are discriminated and isolated from each other during the estimation of modulation scheme, it is necessary to again estimate each modulation scheme of orthogonal amplitude modulation and phase modulation. If there is an error in the initial isolation of orthogonal amplitude modulation and phase modulation from each other, the error not only adversely affects estimation of each modulation scheme, but also reduces the fairness (in probabilistic meaning) of discrimination. As a result, discrimination errors may well be increased. (See, for example, JP-A 2001-86171 (KOKAI).) Furthermore, modulation scheme estimation using CMHD exhibits a problem when realizing real-time processing, since it requires a greater number of operations (see, for example, H. Ketterer et al., "Classification of modulation modes using time-frequency methods," ICASSP '99. Proceedings, Vol. 5, pp. 2471-2474. March 1999).

BRIEF SUMMARY OF THE INVENTION

In accordance with an aspect of the invention, there is provided a modulation scheme estimation apparatus comprising: a receiving unit configured to receive a first signal; a generation unit configured to generate a plurality of first phase amounts; an acquisition unit configured to acquire a plurality of multiplication signals by multiplying the first signal by each of the first phase amounts; an extraction unit configured to extract a plurality of second signals corresponding to respective direct-current components of third signals obtained by subjecting the multiplication signals to Fourier transform; a first computation unit configured to compute a plurality of sums, each of which is a sum of each of the multiplication signals and a corresponding one of the second signals; a second computation unit configured to compute a plurality of absolute values of the sums; and a first identifying unit configured to identify a modulation scheme corresponding to one of the absolute values which has a highest similarity with respect to reference values associated with modulation schemes.

In accordance with another aspect of the invention, there is provided a modulation scheme estimation apparatus comprising: a receiving unit configured to receive a first signal; a generation unit configured to generate a plurality of first phase amounts; an acquisition unit configured to acquire a plurality of multiplication signals by multiplying the first signal by each of the first phase amounts; a first extraction unit configured to extract a plurality of second signals corresponding to respective direct-current components of third signals obtained by subjecting the multiplication signals to Fourier transform; a first computation unit configured to compute a plurality of sums, each of which is a sum of each of the multiplication signals and a corresponding one of the second signals; a second computation unit configured to compute a plurality of absolute values of the sums; a second extraction unit configured to extract a characteristic value of the first signal, the characteristic value differing from the absolute values; and an identifying unit configured to identify a modulation scheme corresponding to the first signal by determining where in a space the first signal are distributed, the space being defined using, as parameters, the characteristic value, and a degree of similarity between reference patterns corresponding to modulation schemes and each of received-signal patterns corresponding to the absolute values.

BRIEF DESCRIPTION OF THE SEVERAL VIEWS OF THE DRAWING

FIG. 1 is a block diagram illustrating a modulation scheme estimation apparatus according to a first embodiment;

FIG. 2 is a view useful in explaining the constellation of QPSK, the DC component of the complex spectrum of QPSK, and complex addition executed in QPSK;

FIG. 4B is a view illustrating a reference pattern in 16-QAM;

FIG. 4C is a view illustrating a reference pattern in 32-QAM;

FIG. 7 is a block diagram illustrating a modulation scheme estimation apparatus according to a third embodiment; and FIG. 8 is a block diagram illustrating a modulation scheme estimation apparatus according to a fourth embodiment.

DETAILED DESCRIPTION OF THE INVENTION

Figure 3A:
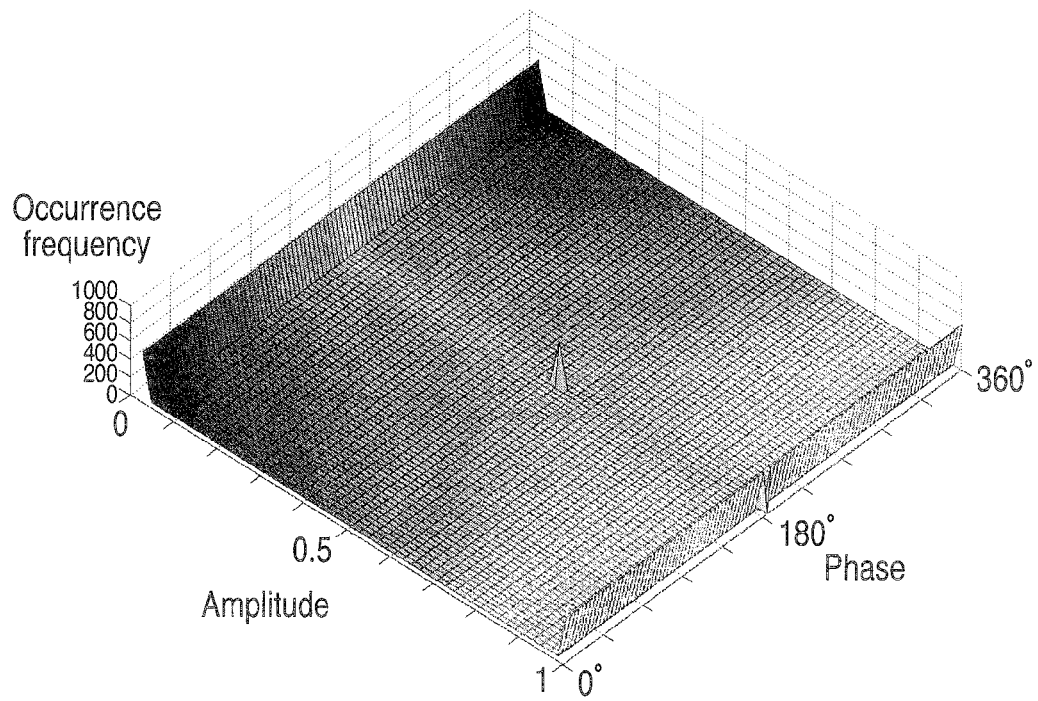
FIG. 3A is a view illustrating a reference pattern in BPSK.
Figure 3B:
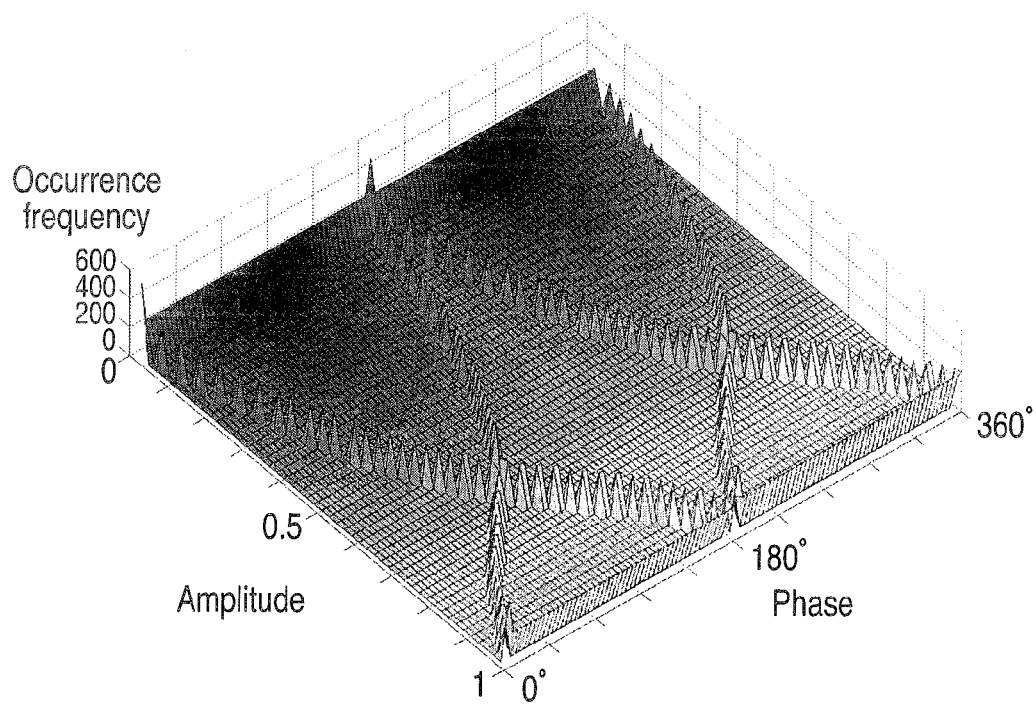
FIG. 3B is a view illustrating a reference pattern in QPSK.
Figure 3C:
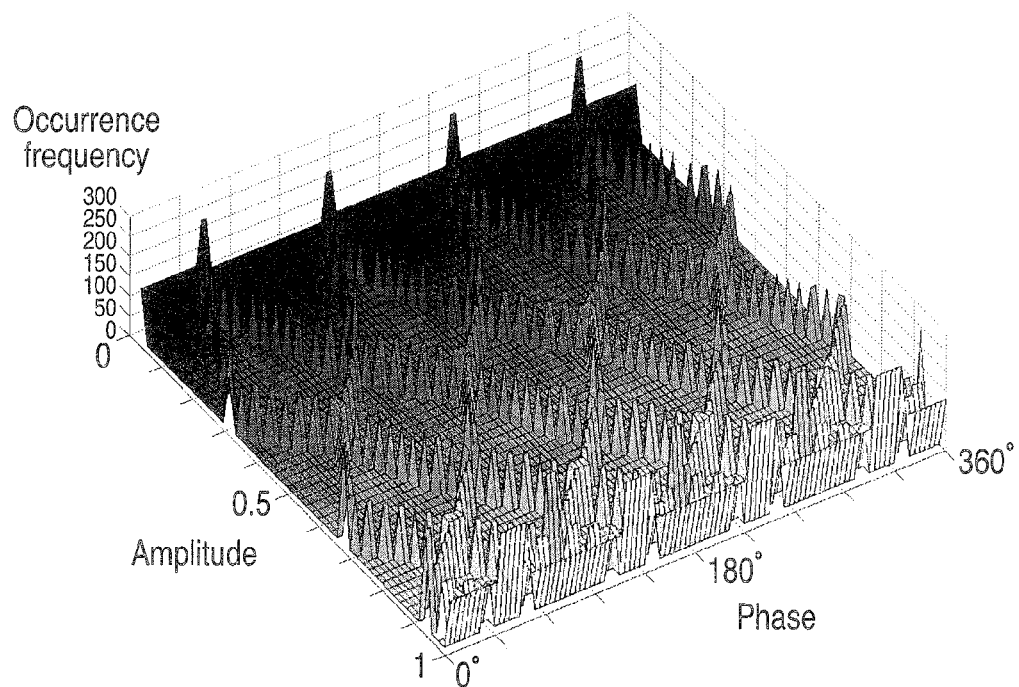
FIG. 3C is a view illustrating a reference pattern in 8-PSK.
Figure 3D:
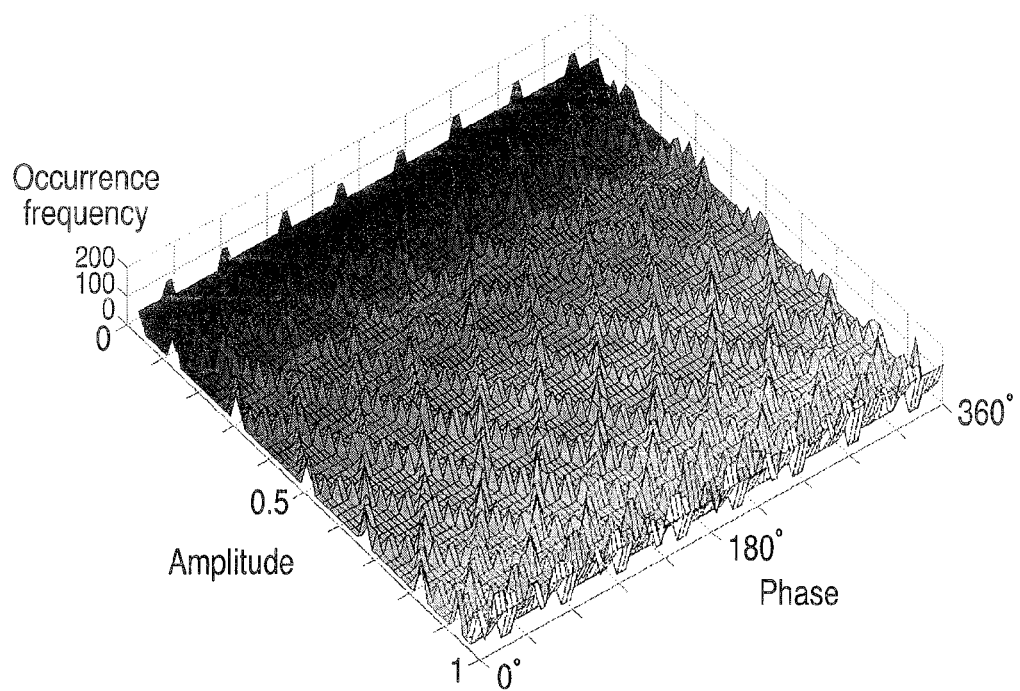
FIG. 3D is a view illustrating a reference pattern in 16-PSK.
Figure 3E:
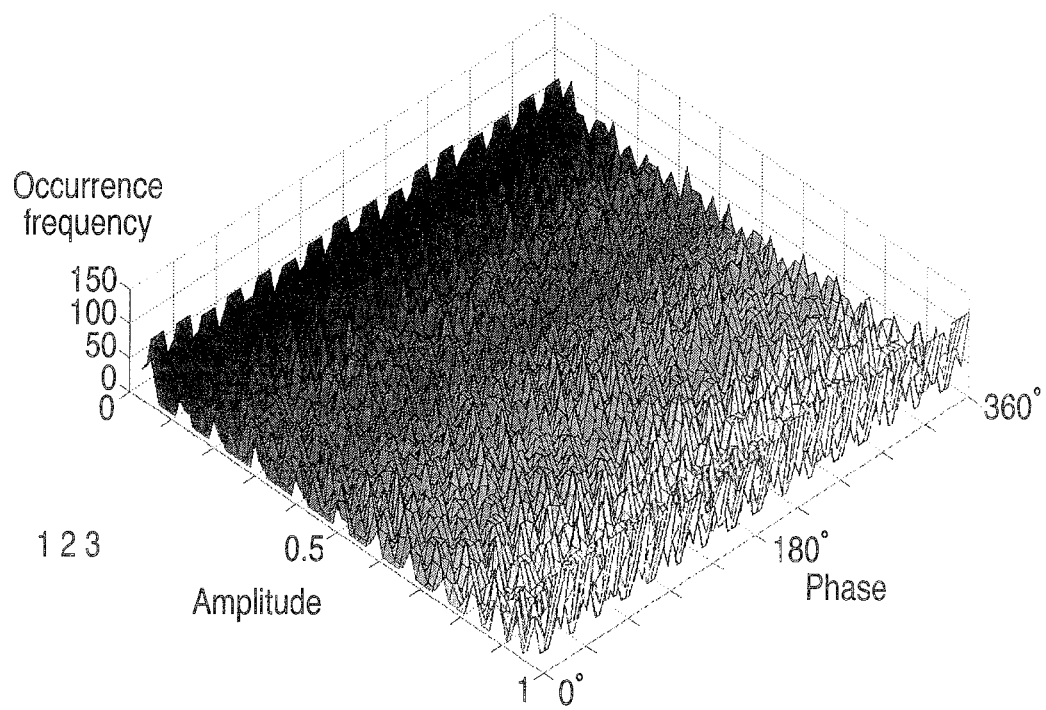
FIG. 3E is a view illustrating a reference pattern in 32-QAM.
Figure 4A:
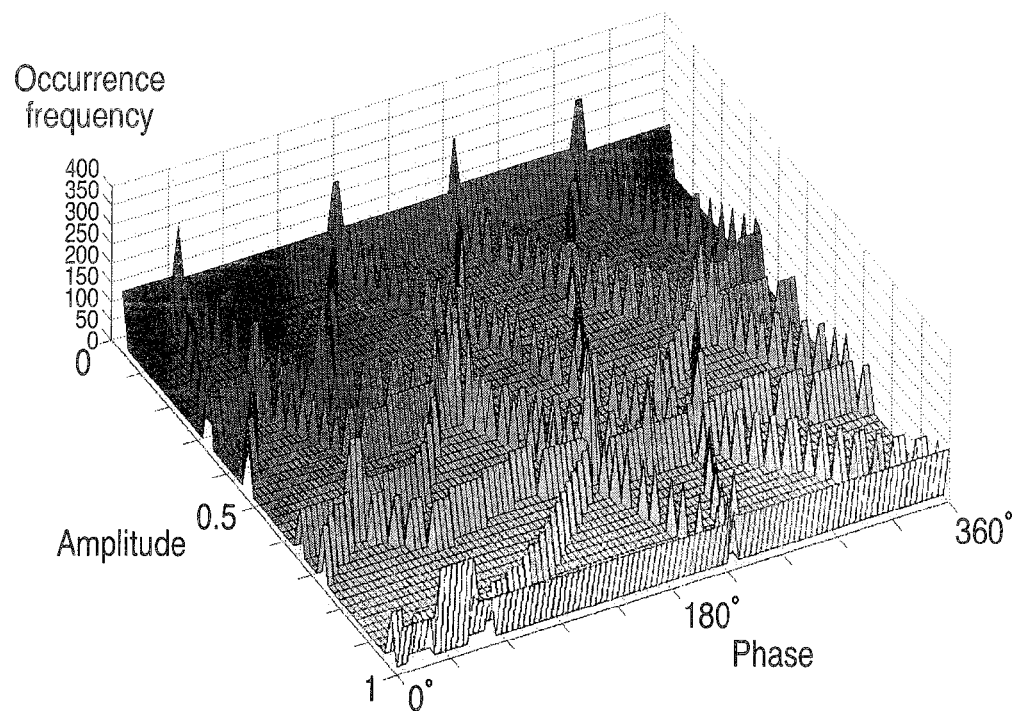
FIG. 4A is a view illustrating a reference pattern in 8-QAM.

Modulation scheme estimation apparatuses and methods according to embodiments of the invention will be described in detail with reference to the accompanying drawings. In the embodiments, like reference numbers denote like elements, and no duplication of description will be made.

The modulation scheme estimation apparatuses and methods of the embodiments can estimate a modulation scheme by a single process of a smaller number of operations.

First Embodiment

Referring first to FIG. 1, a modulation scheme estimation apparatus according to a first embodiment will be described.

The modulation scheme estimation apparatus according to the first embodiment includes an antenna 101, receiving unit 102, complex multiplier 103, phase computation unit 104, fast Fourier transformer (FFT) 105, DC-component extraction unit 106, complex adder 107, absolute-value unit 108, reference pattern storage unit 109, correlation computation unit 110 and identifying unit 111.

The antenna 101 receives a signal sent from a transmitting apparatus (not shown), such as a radio base station, and the receiving unit 102 performs receiving processing, such as filtering, in which the received signal is converted into a signal of a preset frequency, and a preset signal is extracted.

The phase computation unit 104 computes a periodic phase amount with a constant phase width, and transfers the computed phase amount to the complex multiplier 103. Based on the phase amount, the amount of rotation, with which the phase of a signal received by the antenna 101 is to be rotated, is determined. The phase amount is computed regardless of that of the received signal. The phase of a signal is rotated by the complex multiplier 103, as will be described later. If the correlation computation unit 110 already knows the value of N contained in equation (1-6), described later, the phase computation unit 104 outputs, to the correlation computation unit 110, a control signal indicating the start time of the operation of the correlation computation unit 110, when the phase computation unit 104 generates zero phase. Alternatively, the phase computation unit 104 may output a computed phase amount to the correlation computation unit 110, and the correlation computation unit 110 may start correlation computation if it is determined that the phase amount received by the correlation computation unit 110 corresponds to zero phase. Yet alternatively, each n-value of equation (1-6) may be synchronized with the output of the absolute-value unit 108.

The complex multiplier 103 multiplies the output signal of the receiving unit 102 by the phase amount computed by the phase computation unit 104, thereby rotating the phase of the output signal of the receiving unit 102.

The fast Fourier transformer 105 subjects the output signal of the complex multiplier 103 to fast Fourier transform. The DC-component extraction unit 106 extracts only a DC (direct current) component from the signal output from the fast Fourier transformer 105.

The absolute-value unit 108 computes the absolute value of the signal output from the complex adder 107. The reference pattern storage unit 109 stores reference patterns. The reference patterns indicate, for example, M-QAM, BPSK, QPSK, π/4-QPSK and M-PSK, and are distribution patterns that each indicate a distribution of frequencies using the phase and amplitude as parameters. The reference patterns will be described later with reference to FIGS. 3A to 3E and 4A to 4C.

The correlation computation unit 110 computes correlation values between the signal output from the absolute-value unit 108, and the reference patterns stored in the reference pattern storage unit 109. The identifying unit 111 determines the modulation scheme that corresponds to the reference pattern corresponding to the highest correlation value computed by the correlation computation unit 110. Typically, the identifying unit 111 determines the modulation scheme that corresponds to the reference pattern corresponding to the highest degree of similarity. The highest degree of similarity is highest among the degrees of similarity between reference patterns corresponding to modulation schemes, and the patterns corresponding to the absolute values that are computed by the absolute-value unit 108 and correspond to phase amounts computed by the phase computation unit 104.

The basic principle of the embodiments will be described in detail. The basic principle lies in that the idea of CMHD is extended to enable efficient extraction of a characteristic value, and the base formula of CMHD is defined as follows:

$$CMHD_{x,y}(t, f) = \frac{1}{2}\int_{-\infty}^{+\infty}\left(\begin{array}{c}x(t+\tau)y*(t) + \\ x(t)y*(t-\tau)\end{array}\right)e^{-j2\pi f\tau}d\tau \quad (1\text{-}1)$$

where x(t) is a received signal, y(t) is an operation signal, t is time, f is frequency, and * is complex conjugate. If x(t) and y(t) in formula (1-1) are subjected to Fourier transform, the following equation is given $$CMHD_{x,y}(t, f) = \frac{1}{2}(y*(t)X(f)e^{+j2\pi ft} + x(t)Y*(f)e^{-j2\pi ft}) \quad (1\text{-}2)$$

Assuming here that the ratio bandwidth of the received signal is sufficiently small, or the oversampling factor is sufficiently large, the above equation can be made to approximate the following:

$$y(t)=e^{j2\pi f_c t}$$

Accordingly, equation (1-2) can be modified as below.

$$CMHD_{x,y}(t, f) = \frac{1}{2}\left(\begin{array}{c}e^{-j2\pi f_c t}X(f)e^{+j2\pi ft} + \\ x(t)\delta(f - f_c)e^{-j2\pi ft}\end{array}\right) \quad (1\text{-}3)$$

where δ(t) is delta function. Accordingly, if $f=f_c$, the characteristic value is given by $$q(t) = |CMHD_{x,y}(t, f)| = \frac{1}{2}|X(f_c) + x(t)e^{-j2\pi f_c t}| \quad (1\text{-}4)$$

Supposing here that the received signal is a baseband signal, equation (1-4) can be modified as follows:

$$q(t) = |CMHD_{x,y}(t, f)| = \frac{1}{2}|X(0) + x(t)| \quad (1\text{-}5)$$

Based on this idea, it can be understood that in view of extraction of the characteristic value of a modification signal corresponding to the received signal, the CMHD defining equation (1-1) can be given as the absolute value of the sum of the direct-current component of a signal obtained by subjecting the received signal to Fourier transform, and the received signal at time t. Note that in equation (1-5), x(t) is the output signal of the complex multiplier 103, and X(0) corresponds to the output signal of the DC-component extraction unit 106. The computation using equation (1-5) is performed by the absolute-value unit 108. Namely, the correlation computation unit 110 receives a value twice as high as q(t) given by equation (1-5). The correlation computation unit 110 computes correlation values between q(t) and reference patterns, and the identifying unit 111 compares the resultant correlation values. If, thus, the correlation computation unit 110 computes correlation values between the same q(t) and all reference patterns, it is not essential whether the output of the correlation computation unit 110 is a multiple of q(t). Accordingly, the correlation computation unit 110 may use the value twice as high as q(t) for correlation computation.

Referring then to FIG. 2, a description will be given of the computation concepts of the fast Fourier transformer (FFT) 105, DC-component extraction unit 106 and complex adder 107. FIG. 2 shows the case of QPSK.

The constellation 200 of FIG. 2 is that of QPSK. Complex spectrum 201 in FIG. 2 shows the DC component of the complex spectrum obtained by subjecting a QPSK signal to Fourier transform, and r indicates the complex amount of the DC component. Using the DC component of the complex spectrum, a signal point in the constellation 200 is shifted (i.e., subjected to addition) to signal point 202. The absolute value of the vector directed from the origin to the shifted signal point is the characteristic value of the signal. Namely, the characteristic value of the signal is expressed by the amounts indicated by the arrows obtained by orthogonally projecting the vector to the imaginary axis and real axis. In this case, the DC component of a complex spectrum coincides with the radius of the symbols of the constellation. In general, however, the radius (the distance between the origin and each signal point in QPSK) of the symbols included in a constellation does not always coincide with the DC component of the complex spectrum corresponding to the constellation. However, it is not essential that the DC component of the complex spectrum coincides with the radius of the symbols of the constellation, but it is essential that the characteristic value of the target modification scheme is acquired by acquiring phase information from amplitude information.

The phase computation unit 104, correlation computation unit 110 and identifying unit 111 will be described.

The above-mentioned computations require that the phase of the received signal be known, or require prerequisites for the case where the phase of the received signal is detectable. How to deal with the case where the phase of the received signal is unknown will be described. When the phase of the received signal is unknown, the complex multiplier 103 multiplies received signal x(t) as the output signal of the receiving unit 102 by the phase amount computed by the phase computation unit 104, and the correlation computation unit 110 performs correlation computation concerning reference patterns. Namely, it can be understood that it is sufficient if newly received signal g(t) is re-defined as follows:

$$g(t)=x(t)\exp(j2\pi n/N) \qquad (1\text{-}6)$$

where N is the number of divisions, n is a value falling within a range of 0 to N−1. In this case, the correlation computation unit 110 computes the correlation value between each reference pattern, and the output signal of the absolute-value unit 108 corresponding to each value of g(t) (n=0, . . . , N−1). The identifying unit 111 determines the modulation scheme corresponding to one of the reference patterns that has the highest correlation value among correlation values set for each phase (n=0, . . . , N−1). An exiting expression may be used to compute the correlation values. Thus, even when the phase of the received signal is unknown, highly reliable identification of modulation schemes can be realized.

Further, since the phase of the received signal is determined depending upon where on the phase axis the peak of the correlation values exists, the peak information can be used as pre-information for demodulation. Depending upon where on the phase axis the peak of the correlation values exists, the position of the corresponding signal point in the constellation is detected.

Referring then to FIGS. 3A to 3E and 4A to 4C, a description will be given of the reference patterns stored in the reference pattern storage unit 109.

FIGS. 3A to 3E and 4A to 4C are three-dimensional graphs illustrating various modulation schemes, each using the three axes to express the phase states acquired by the equation (1-6), the characteristic values acquired by the equation (1-5), and the occurrence frequency of their combinations. Namely, these distributions are reference patterns. Specifically, FIGS. 3A to 3E each show a distribution of functions concerning two parameters (i.e., phase and amplitude (=characteristic value)) obtained in BPSK, QPSK, 8-PSK, 16-PSK and 32-PSK. Similarly, FIGS. 4A to 4C each show a distribution of functions concerning two parameters (i.e., phase (corresponding to n of the equation (1-6)) and amplitude (=characteristic value)) obtained in 8-QAM, 16-QAM and 32-QAM.

In FIGS. 3A to 3E and 4A to 4C, periodic waveforms appear on the plane formed by the phase and amplitude axes. This is especially conspicuous in FIGS. 3B to 3D, 4A and 4B. Since thus, the reference patterns show periodic waveforms, the modulation scheme of the received signal can be identified by computing the levels of correlation between the reference patterns of FIGS. 3A to 3E and 4A to 4C, and the signal output from the absolute-value unit 108 and corresponding to the received signal.

In the above-described first embodiment, the correlation value between a distribution of functions concerning two parameters (i.e., phase and amplitude (=characteristic value)) obtained in each of the modulation schemes, such as linear modulation schemes BPSK, QPSK, π/4-QPSK, M-PSK and M-QAM, and the characteristic value distribution of the received signal is inspected to determine the modulation scheme of the received signal. Further, since only an extremely small number of computations are required, real-time processing can be realized using small scale hardware, or software that minimizes the consumption of processor resources. Since the modulation scheme of an unknown modulation signal can automatically be identified, it can be monitored whether the identified modulation scheme is legal. In addition, software defined radio for enabling demodulation processing based on the identified modulation scheme can be realized.

Second Embodiment

A modulation scheme estimation apparatus according to a second embodiment will now be described with reference to FIG. 5.

Figure 5:
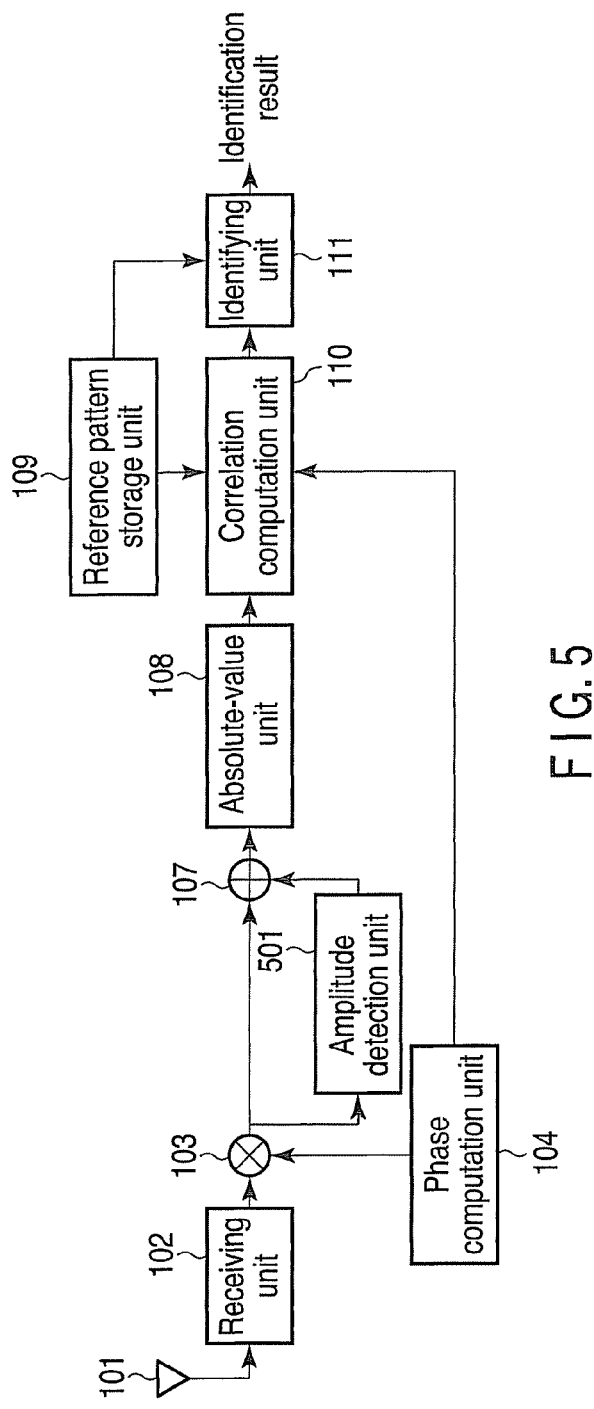
FIG. 5 is a block diagram illustrating a modulation scheme estimation apparatus according to a second embodiment.

The second embodiment differs from the first embodiment in that the former employs an amplitude detector 501 as shown in FIG. 5, instead of the fast Fourier transformer 105 and DC-component extraction unit 106.

The amplitude detector 501 detects a complex amplitude from the output signal of the complex multiplier 103.

Figure 6:
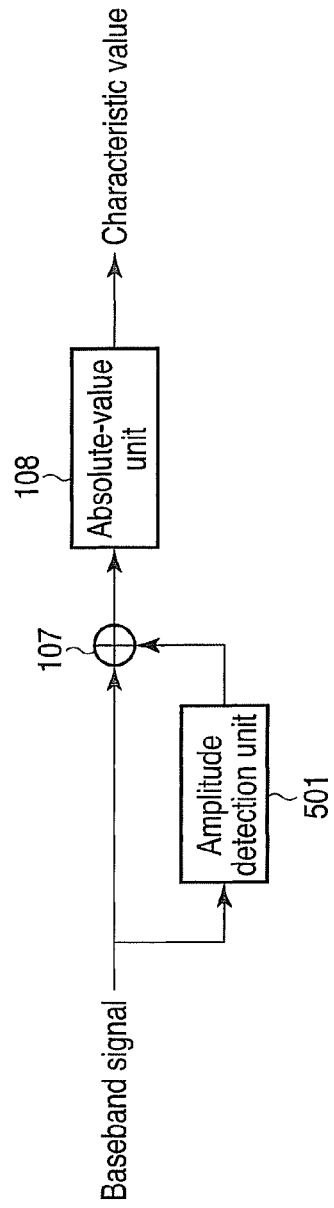
FIG. 6 is a view illustrating an amplitude detector, complex adder and absolute-value unit shown in FIG. 5.

Referring then to FIG. 6, the amplitude detector 501, complex adder 107, absolute-value unit 108, which are essential parts of the embodiments shown in FIG. 5 for performing signal processing, will be described.

In the first embodiment, the characteristic value of a modulation signal is computed based on the received signal corresponding to the modulation signal, and the DC component of a signal obtained by Fourier transforming the received signal. In contrast, in the second embodiment, the characteristic value of the modulation signal is computed using a different method. Assuming that the received signal is x(t), the signal amount corresponding to the DC component of a signal obtained by Fourier transforming the received signal is given by the following equation:

$$r = E[|\text{real}(x(t))|] + jE[|\text{imag}(x(t))|] \qquad (1\text{-}7)$$

where E represents ensemble averaging, real( ) represents extraction of a real part, and image( ) represents extraction of an imaginary part. Accordingly, the characteristic value corresponding to the equation (1-5) is given by $$a(t) = |r + x(t)| \qquad (1\text{-}8)$$

Namely, the amplitude detector 501 performs computation using the equation (1-7), and the complex adder 107 computes the sum of the received signal x(t) as the output signal of the complex multiplier 103, and r as the output of the amplitude detector 501. The absolute-value unit 108 computes the absolute value of r+x(t), i.e., executes the expression (1-8).

In the above-described second embodiment, the real part and imaginary part of the received signal is subjected to ensemble averaging to thereby obtain the same advantage as the first embodiment, without executing Fourier transform.

Third Embodiment

Referring then to FIG. 7, a modulation scheme estimation apparatus according to a third embodiment will be described.

The third embodiment differs from the first embodiment in that the former employs an accumulative adder 701 and identifying unit 702 as shown in FIG. 7, instead of the reference pattern storage unit 109, correlation computation unit 110 and identifying unit 111.

The accumulative adder 701 accumulates the frequencies of the amplitudes of signals output from the absolute-value unit 108 and corresponding to the values (ranging from 0 to N−1) of n included in g(t), thereby acquiring an amplitude accumulation distribution. This accumulation distribution is an amplitude distribution that is expressed using, for example, the horizontal axis to indicate amplitude, and the vertical axis to indicate occurrence frequency. This accumulation distribution is obtained by accumulating the frequencies of phases in a three-dimensional (amplitude-phase-occurrence frequency) distribution. Alternatively, the accumulative adder 701 may acquire an accumulation distribution by accumulating the frequencies of amplitudes in the amplitude-phase-occurrence frequency distribution, thereby obtaining a phase distribution expressed using the horizontal axis to indicate phase amount, and the vertical axis to indicate occurrence frequency.

The identifying unit 702 identifies the modulation scheme corresponding to the accumulation distribution computed by the accumulative adder 701. The identifying unit 702 pre-stores the features of accumulation distributions corresponding to respective modulation schemes, and identifies the modulation scheme by comparing the accumulation distribution computed by the accumulative adder 701, with the stored features. In this case, the identifying unit 702 stores, in relation to the modulation schemes, normal amplitude distributions corresponding to amplitude distributions, and normal phase distributions corresponding to phase distributions. The identifying unit 702 compares the accumulation distribution obtained from a received signal, with an accumulation distribution computed based on at least one combination of the stored normal amplitude distributions and normal phase distributions, thereby determining a computed accumulation distribution having a highest similarity with respect to the accumulation distribution corresponding to the received signal, and identifying the modulation scheme corresponding to the determined accumulation distribution. Instead of this identification method, a simpler identification method may be used. In this case, only the frequencies of amplitudes corresponding to the modulation schemes are beforehand computed, and the degrees of correspondence between the occurrence frequency distributions of detected amplitudes and the computed occurrence frequency distributions are checked to determine a modulation scheme that corresponds to the occurrence frequency distribution of detected amplitudes having a highest degree of correspondence.

The modulation scheme can also be identified by subjecting the waveforms of 3A to 3E and 4A to 4C to Fourier transform, and performing spectra observation. For instance, in spectra observation, determination is performed based on, for example, the relative magnitudes of local maximum values of the spectra, or the two-dimensional positions or the phase states of the spectra.

In the above-described third embodiment, the modulation scheme of the received signal can be estimated not by computing a correlation value between distributions each concerning the frequencies of combinations of detected parameter values (i.e., phases and amplitudes (characteristic values)), but by simply checking the degree of similarity between one of the above-mentioned phase distribution and amplitude distribution, and that corresponding to the received signal.

Fourth Embodiment

Referring to FIG. 8, a modulation scheme estimation apparatus according to a fourth embodiment will be described.

The apparatus of the fourth embodiment is acquired by adding characteristic-value extraction units 801 and 802 to the modulation scheme estimation apparatus of FIG. 5, and replacing the identifying unit 111 of FIG. 5 with an identifying unit 803. Since, in general, modulation scheme estimation apparatuses may receive modulation signals other than orthogonally amplitude modulated signals or phase modulated signals, the erroneous determination rate is measured by performing identification using the characteristic value of a modulation signal other than the orthogonal amplitude modulated signals or phase modulated signals. In contrast, if it is attempted to identify another modulation scheme, signals modulated by orthogonal amplitude modulation or phase modulation may be excluded.

The characteristic-value extraction units 801 and 802 extract different characteristic values from the signal output by the receiving unit 102. It is desirable that the extracted characteristic values should indicate features dependent of each other. Supposing, for example, that the received signal is an analog modulation signal, the signal output from the receiving unit 102 is subjected to a linear predictive coding (LPC) analysis as a linear prospective analysis for analyzing the feature of a sound signal, or subjected to a wavelet analysis, thereby acquiring a characteristic value. In the fourth embodiment, two characteristic values are obtained using the two characteristic-value extraction units 801 and 802. However, one characteristic value may be obtained and output to the identifying unit 803. Extraction of characteristic values of the received signal is not limited to the characteristic-value extraction units 801 and 802. Both a known method and a new method may be used for the extraction. It is sufficient if the feature of the received signal can be extracted.

The identifying unit 803 acquires a correlation value from the correlation computation unit 110, and independent characteristic values from the characteristic-value extraction units 801 and 802. The identifying unit 803 identifies the modulation scheme, based on where in the three-dimensional space, which is defined using the correlation value and two characteristic values as parameters, the values obtained from the received signal are positioned. The identifying unit 803 uses, for example, a support vector machine (SVM) or neural network (NN). Further, the identifying unit 803 sets threshold values corresponding to respective characteristic values. When the detected characteristic value is not less than (or less than) a certain threshold value, the identifying unit 803 separates an AM modulation signal by, for example, LPC analysis if the wave subjected to AM modulation is a voice wave, and identifies the modulation scheme using a correlation value. Namely, when the modulation scheme is limited to liner modulation, noise can be eliminated, which realizes more reliable identification than in the other embodiments.

If the number of independent characteristic values input to the identifying unit 803 is increased, the modulation schemes to be separated and identified can be extended to both analog modulation schemes (such as AM, FM, SSB, DSB, SC-AM, VSB and ISB) and digital modulation schemes (such as M-FSK, MS, M-PSK, M-QAM and $\pi/4$-QPSK).

In the above-described fourth embodiment, a larger number of modulation schemes can be identified with higher accuracy. Further, if a larger number of independent characteristic values are input, the effectiveness of the modulation scheme estimation apparatus in the real environment can be further enhanced.

The modulation scheme estimation apparatuses and methods according to the embodiments relate to signal detection techniques such as modulation scheme identification, and in particular, to automatic detection of the modulation schemes of modulation signals. Therefore, they are also applicable to, for example, identification of signal types in cognitive radio techniques or SDR techniques. They can be further applied to a radio system in which the scheme of an arrived electric wave is estimated to automatically establish a mechanism for receiving the wave and start communication. Thus, the modulation scheme estimation apparatuses and methods according to the embodiments are essential techniques for next-generation radio communication systems.

In the above-described embodiments, the characteristic value of a received signal is acquired using a CMHD basic formula, and is compared with reference patterns corresponding to modulation schemes. By virtue of this structure, the modulation schemes (M-QAM, BPSK, QPSK, $\pi/4$-QPSK, M-PSK, etc.) for orthogonal amplitude modulation and phase modulation can be separated and identified by real-time batch processing using a small number of computations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A modulation scheme estimation apparatus comprising:
a receiving unit configured to receive a first signal;
a generation unit configured to generate a plurality of first phase amounts;
an acquisition unit configured to acquire a plurality of multiplication signals by multiplying the first signal by each of the first phase amounts;
an extraction unit configured to extract a plurality of second signals corresponding to respective direct-current components of third signals obtained by subjecting the multiplication signals to Fourier transform;
a first computation unit configured to compute a plurality of sums, each of which is a sum of each of the multiplication signals and a corresponding one of the second signals;
a second computation unit configured to compute a plurality of absolute values of the sums; and
a first identifying unit configured to identify a modulation scheme corresponding to one of the absolute values which has a highest similarity with respect to reference values associated with modulation schemes.

2. The apparatus according to claim 1, wherein the first identifying unit includes:
a storage unit configured to store a plurality of reference patterns in relation to the modulation schemes, the reference patterns each indicating an occurrence frequency distribution made by using, as parameters, amplitudes corresponding to the absolute values and second phase amounts corresponding to the first phase amounts; and
a second identifying unit configured to identify a modulation scheme corresponding to a reference pattern that is included in the reference patterns and exhibits a highest similarity to received-signal patterns corresponding to the absolute values.

3. The apparatus according to claim 2, wherein the second identifying unit includes:
a third computation unit configured to compute each correlation value between the reference patterns and each of the absolute values to obtain a plurality of correlation values; and
a third identifying unit configured to identify a modulation scheme corresponding to one of the reference patterns which has a highest correlation value of the correlation values.

4. The apparatus according to claim 1, wherein the first identifying unit includes:
a third computation unit configured to compute a distribution of occurrence frequencies of amplitudes corresponding to the absolute values in accordance with the first phase amounts, to acquire an occurrence frequency distribution using the amplitudes and the phase amounts as parameters, and to compute at least one of an amplitude distribution obtained by accumulating the phase amounts in the occurrence frequency distribution, and a phase distribution obtained by accumulating the amplitudes in the occurrence frequency distribution;
a storage unit configured to store, in relation to the modulation schemes, a plurality of reference amplitude distributions corresponding to the amplitude distribution, and a plurality of reference phase distributions corresponding to the phase distribution; and
a second identifying unit configured to identify a modulation scheme included in the modulation schemes and corresponding to at least one of a reference amplitude distribution and a reference phase distribution, the reference amplitude distribution being included in the reference amplitude distributions and having a highest degree of similarity to the amplitude distribution, and the reference phase distribution being included in the reference phase distributions and having a highest degree of similarity to the phase distribution.

5. The apparatus according to claim 1, wherein the extraction unit extracts, as the second signals, signals each expressed by a real part obtained by performing ensemble averaging on real parts of the multiplication signals, and an imaginary part obtained by performing ensemble averaging on imaginary parts of the multiplication signals.

6. A modulation scheme estimation apparatus comprising:
a receiving unit configured to receive a first signal;
a generation unit configured to generate a plurality of first phase amounts;
an acquisition unit configured to acquire a plurality of multiplication signals by multiplying the first signal by each of the first phase amounts;
a first extraction unit configured to extract a plurality of second signals corresponding to respective direct-current components of third signals obtained by subjecting the multiplication signals to Fourier transform; a first computation unit configured to compute a plurality of sums, each of which is a sum of each of the multiplication signals and a corresponding one of the second signals;
a second computation unit configured to compute a plurality of absolute values of the sums;
a second extraction unit configured to extract a characteristic value of the first signal, the characteristic value differing from the absolute values; and
an identifying unit configured to identify a modulation scheme corresponding to the first signal by determining where in a space the first signal is distributed, the space being defined using, as parameters, the characteristic value, and a degree of similarity between reference patterns corresponding to modulation schemes and each of received-signal patterns corresponding to the absolute values.

7. The apparatus according to claim 6, wherein the identifying unit includes a storage unit configured to store a plurality of reference patterns in relation to the modulation schemes, the reference patterns each indicating an occurrence frequency distribution made by using, as parameters, amplitudes corresponding to the absolute values and second phase amounts corresponding to the first phase amounts.

8. The apparatus according to claim 6, wherein the identifying unit includes a third computation unit configured to compute a plurality of correlation values between the reference patterns and each of the absolute values, and to set the correlation values as the degree.

9. The apparatus according to claim 6, wherein the identifying unit includes:
a third computation unit configured to compute a distribution of occurrence frequencies of amplitudes corresponding to the absolute values in accordance with the first phase amounts, to acquire an occurrence frequency distribution using the amplitudes and the phase amounts as parameters, and to compute at least one of an amplitude distribution obtained by accumulating the phase amounts in the occurrence frequency distribution, and a phase distribution obtained by accumulating the amplitudes in the occurrence frequency distribution;

a storage unit configured to store, in relation to the modulation schemes, a plurality of reference amplitude distributions corresponding to the amplitude distribution, and a plurality of reference phase distributions corresponding to the phase distribution,
wherein the identifying unit identifies a modulation scheme included in the modulation schemes, using at least one of a first degree of similarity and a second degree of similarity, the first degree being a degree of similarity between the amplitude distribution and a reference amplitude distribution included in the reference amplitude distributions, the second degree being a degree of similarity between the phase distribution and a reference phase distribution included in the reference phase distributions.

10. The apparatus according to claim 6, wherein the second extraction unit extracts the characteristic value by a voice-signal linear prediction analysis.

11. The apparatus according to claim 6, wherein the first extraction unit extracts, as the second signals, signals each expressed by a real part obtained by performing ensemble averaging on real parts of the multiplication signals, and an imaginary part obtained by performing ensemble averaging on imaginary parts of the multiplication signals.

12. A modulation scheme estimation method comprising:
receiving a first signal;
generating a plurality of first phase amounts;
acquiring a plurality of multiplication signals by multiplying the first signal by each of the first phase amounts;
extracting a plurality of second signals corresponding to respective direct-current components of third signals obtained by subjecting the multiplication signals to Fourier transform;
computing a plurality of sums, each of which is a sum of each of the multiplication signals and a corresponding one of the second signals;
computing a plurality of absolute values of the sums; and
identifying a modulation scheme corresponding to one of the absolute values which has a highest similarity with respect to reference values associated with modulation schemes.

13. A modulation scheme estimation method comprising:
receiving a first signal; generating a plurality of first phase amounts;
acquiring a plurality of multiplication signals by multiplying the first signal by each of the first phase amounts;
extracting a plurality of second signals corresponding to respective direct-current components of third signals obtained by subjecting the multiplication signals to Fourier transform;
computing a plurality of sums, each of which is a sum of each of the multiplication signals and a corresponding one of the second signals;
computing a plurality of absolute values of the sums;
extracting a characteristic value of the first signal, the characteristic value differing from the absolute values; and
identifying a modulation scheme corresponding to the first signal by determining where in a space the first signal is distributed, the space being defined using, as parameters, the characteristic value, and a degree of similarity between reference patterns corresponding to modulation schemes and each of received-signal patterns corresponding to the absolute values.

* * * * *